Sept. 11, 1923.  1,467,315

F. H. GROVE

COLLAPSIBLE CORE

Original Filed Jan. 14, 1921    2 Sheets-Sheet 1

Inventor

Frank H. Grove

BY: Freese, Merkel, Saywell, and Ord
Attorney

Sept. 11, 1923. 1,467,315
F. H. GROVE
COLLAPSIBLE CORE
Original Filed Jan. 14, 1921   2 Sheets-Sheet 2
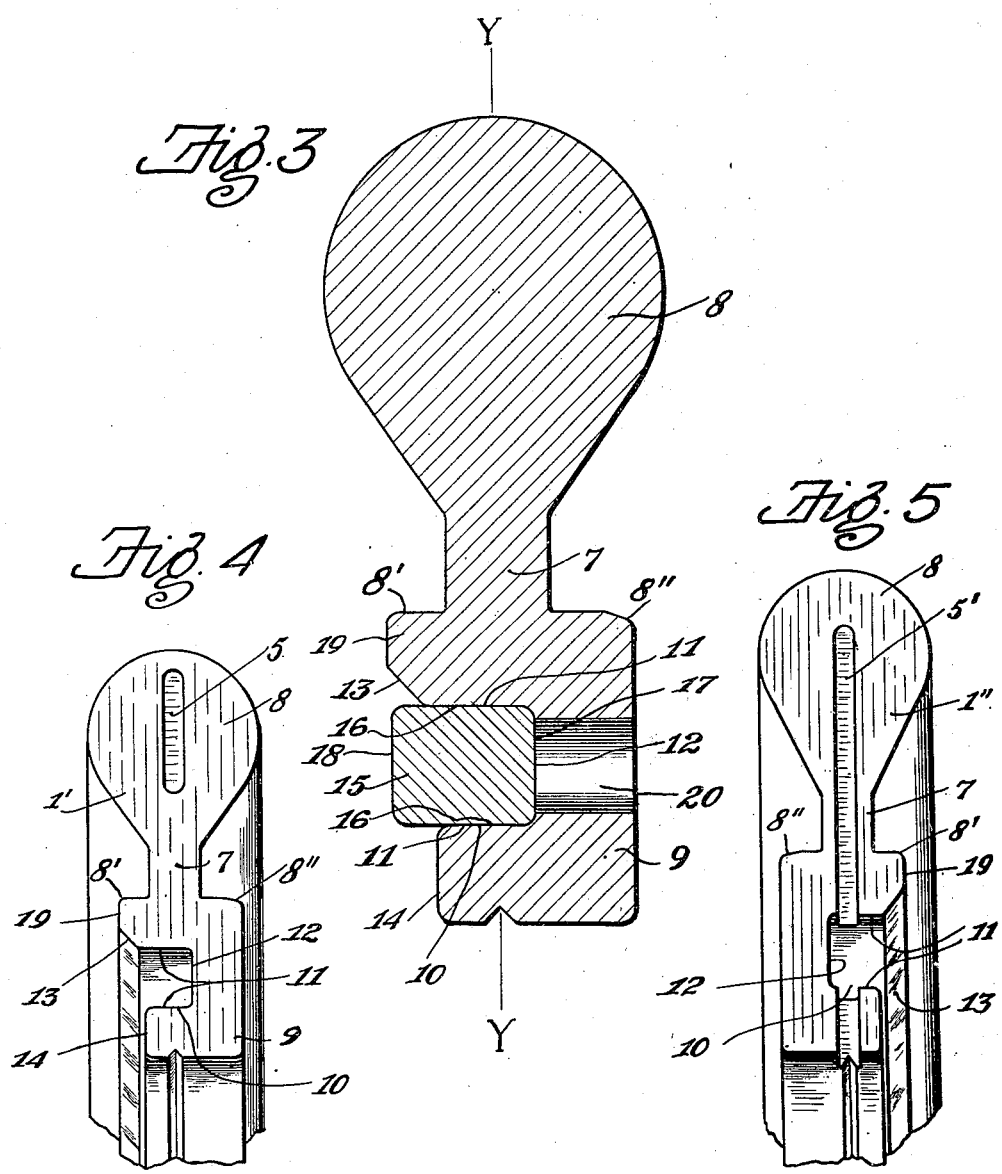
Inventor
Frank H. Grove
Attorney Patented Sept. 11, 1923.

1,467,315

UNITED STATES PATENT OFFICE.

FRANK H. GROVE, OF COLUMBIANA, OHIO.

COLLAPSIBLE CORE.

Application filed January 14, 1921, Serial No. 437,298. Renewed July 30, 1923.

*To all whom it may concern:*

Be it known that I, FRANK H. GROVE, a citizen of the United States, residing at Columbiana, in the county of Columbiana and State of Ohio, have invented certain new and useful Improvements in Collapsible Cores, of which the following is a specification.

The invention relates to sectional cores for use in making automobile tires, and the object of the improvement is to provide simple means for rigidly holding the sections of the core in true circumferential alinement during the time the tire is being built upon the core and cured in a mold, such means being readily detached from the core to permit a collapse of the same for removal from the completed tire.

Certain difficulties and dangers attend the use of a wedge ring driven into a tapered groove, arising from the fact that unless the wedge and taper are of exactly the proper pitch, there is a tendency of the ring to jump out of the groove on one side when it is being forced into the groove by hammering on the other side; and even though a proper pitch is provided for normally holding the ring in the groove, the jars and strains to which the core is subjected in actual use, tends to and sometimes does loosen the ring and permits it to drop out of the groove, with the attendant danger of a premature collapse of the core and a dropping of the ring upon the feet of the workman.

Further difficulty arises from the use of a securing ring located entirely at one side of the median plane of the core, because the clamping or securing action of the ring is limited to the one side of the core and leaves the other side free to go and come with a leverage which ultimately loosens and sometimes ejects the ring from the groove when the core is subjected to bending or twisting concussions and strains.

These difficulties and dangers are avoided by the present improvement, which involves the use of a groove having parallel sides perpendicular to the plane of the core, and extending in depth from one side of the flange to a substantial distance beyond the median plane of the core; and a corresponding ring having like parallel sides perpendicular to its plane, machined for fitting tightly in the groove, and adapted to be forced or driven into the groove a substantial distance beyond the median plane of the core.

Figure 1:
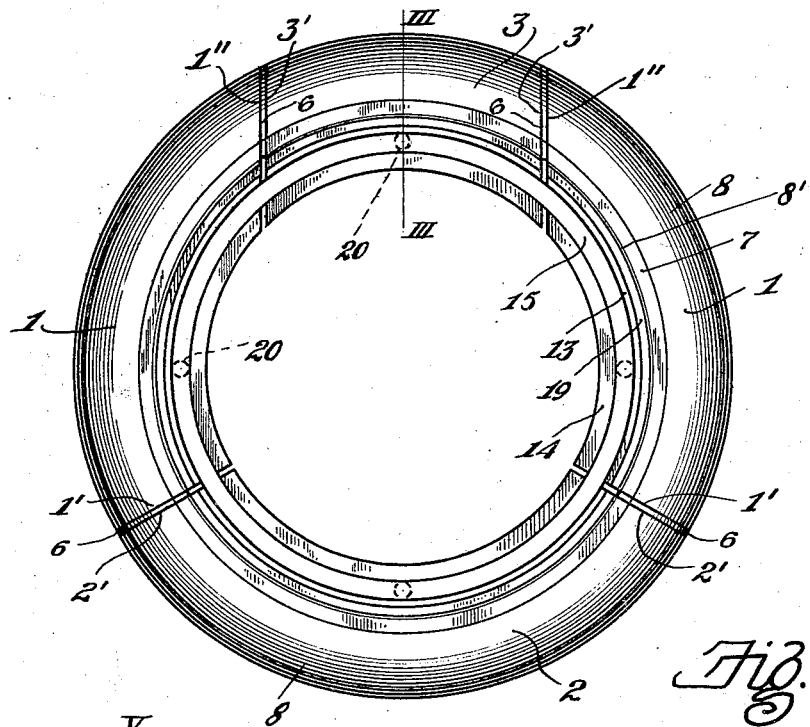
Figure 2:
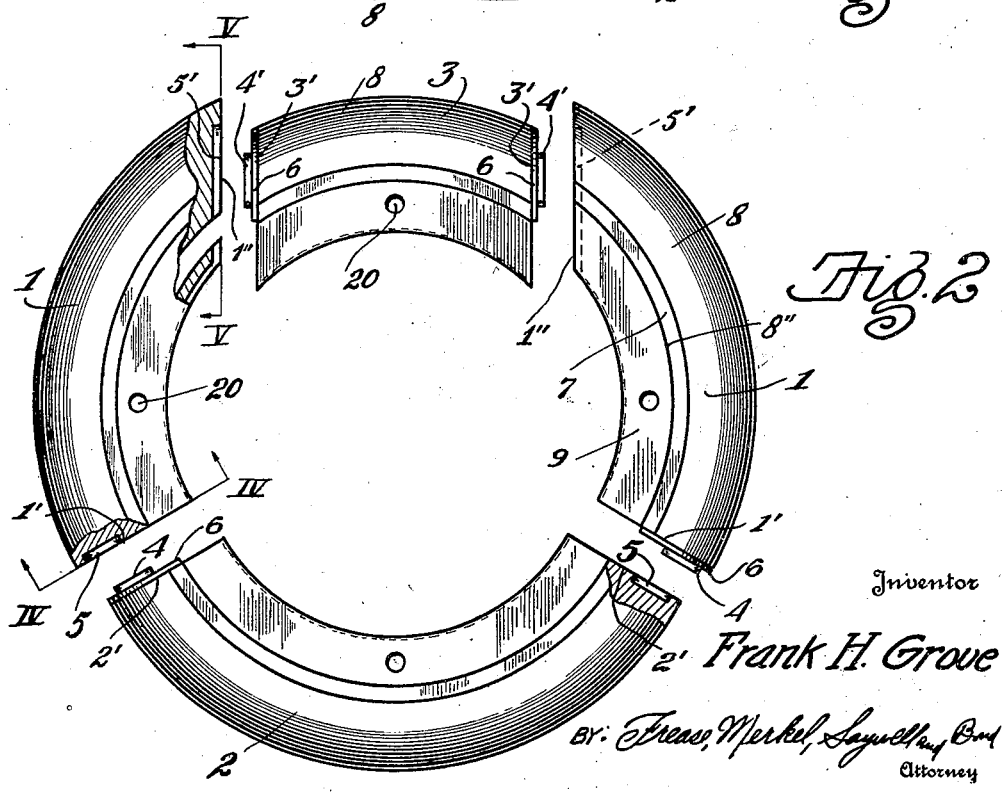

A preferred embodiment of the invention is illustrated in the accompanying drawings forming part hereof, in which Figure 1 is a side elevation of a section with the clamping ring in place;

Fig. 2, a similar elevation with the ring removed showing the core sections separated from each other;

Fig. 3, a cross section of the core and ring as on line III—III, Fig. 1;

Fig. 4, an end view of one section as on line IV—IV Fig. 2; and

Fig. 5, an end view of one core section as on line V—V, Fig. 2.

Similar numerals refer to similar parts throughout the drawings.

The core may be divided into four sections including two diametrically opposite similar sections 1, and two diametrically opposite dissimilar sections 2 and 3; the ends 2' of the section 2 and the abutting ends 1' of the sections 1 being cut on radial lines, and the ends 3' of the section 3 and the abutting ends 1'' of the sections 1, being cut on lines parallel to the median diameter III of the core; so that section 3 may be moved directly inward to permit a collapsing of the core and a removal of the same from inside a tire which has been built and cured thereon, in a manner well known in the art.

Suitable tongues 4 and corresponding recesses 5 are provided on the ends of sections 1 and 2 for alining the ends when abutted together, and like tongues 4' and corresponding slideways 5' are provided in the abutting ends of 3 and 1 for sliding engagement when these sections are abutted together. The tongues 4 and 4' may be formed on wearing plates 6 secured to the ends of the sections and adapted for replacement in case of need.

The flange 7 extending inward from the body or ball 8 of the core is enlarged on both sides adjacent to the ball to form the shoulders 8' and 8'' which may be used in the usual manner as a guide or abutment for the formation of the bead of a tire; and in one face of the enlarged portion 9 of the flange is cut or formed the annular groove 10 having its side walls 11 formed square and parallel with each other and perpendicular to the median plane Y of the core; the groove being formed or cut deep enough so that its bottom 12 will be located a substantial distance within or below the median plane of the core.

The enlarged portion 9 of the flange may be beveled as at 13 outside the groove, and may be reduced in thickness as at 14 inside the groove, so as to decrease the depth of the groove; and the beveled face 13 may serve as a guide for directing the ring 15 into the groove; no portion, however, of the walls proper of the groove, being bevelled or inclined.

The ring 15 is cut or formed square in all its sides, and the faces 16 corresponding to the sides 11 of the groove are made parallel with each other and perpendicular to the plane of the ring, and are machined to fit tightly in the groove when driven or forced therein. The ring is preferably made of such depth that when one edge 17 is driven into the groove against the bottom thereof, the other edge 18 will be substantially flush with the adjacent shoulder forming enlargement 19 of the flange, which serves to shield the ring from being impinged by the workman or his tools when building a tire on the core.

An aperture 20 leading from the bottom of the groove to the opposite side of the enlarged portion 9 of the flange, is provided in each section of the core, through which aperture a punch or other tool may be inserted for driving the ring out of the groove in the usual manner; and it will be understood that the groove 10 is so formed or cut in the flanges of the sections as to be normally in annular alinement when the core sections are in true circumferential alinement with each other.

For using the core, the sections are assembled in the position shown in Fig. 1, and the ring 15 is then inserted and driven into the annular groove 10 so that its inner edge will extend to a substantial distance beyond the median plane of the core, as shown in Fig. 3, and it is evident that the tight machine fit of the ring between the parallel sides of the groove will serve to hold the ring in the groove against any tendency to eject it, less than a positive pressure applied to the inner edge of the ring, and that the location of a substantial portion of the ring on both sides of the median line of the core serves to clamp the sections together with a positive action on both sides of the median plane.

I claim:

1. A sectional core for automobile tires or the like having enlarged flanges on the inner side of the sections, normally alined annular grooves in one face of the flanges having parallel sides perpendicular to the plane of the core, and a ring having parallel faces perpendicular to its plane formed to fit tightly between the sides of the grooves, for solely securing the core sections in circumferential alinement.

2. A sectional core for automobile tires or the like having enlarged flanges on the inner side of the sections, normally alined annular grooves in one face of the flanges having parallel sides perpendicular to the plane of the core and extending a substantial distance beyond the median plane of the core, and a ring having parallel faces perpendicular to its plane formed to fit tightly between the sides of the groove and adapted to be driven into the groove beyond said median plane for securing the core sections in circumferential alinement.

3. A sectional core for automobile tires or the like having enlarged flanges on the inner side of the sections, normally alined annular grooves in one face of the flanges extending a substantial distance beyond the median plane of the core, and a ring formed to fit tightly between the sides of the groove and adapted to be driven into the groove beyond said median plane for securing the core sections in circumferential alinement.

FRANK H. GROVE.